United States Patent

McAllister et al.

[15] 3,644,212

[45] Feb. 22, 1972

[54] ZINC-MAGNESIUM SILICO-GERMANATE PHOSPHOR COMPOSITION AND METHOD OF PREPARING SAME

[72] Inventors: William A. McAllister, Convent Station; Joseph W. Sausville, Glen Rock, both of N.J.

[73] Assignee: Westinghouse Electric Corporation, Pittsburgh, Pa.

[22] Filed: Feb. 18, 1971

[21] Appl. No.: 116,572

Related U.S. Application Data

[63] Continuation-in-part of Ser. No. 834,971, June 20, 1969, abandoned.

[52] U.S. Cl. ...................................................... 252/301.6 F
[51] Int. Cl. ............................................................ C09k 1/54
[58] Field of Search ............................. 252/301.4 F, 301.6 F

[56] References Cited

UNITED STATES PATENTS

| | | | |
|---|---|---|---|
| 2,554,999 | 5/1951 | Merill et al. | 252/301.6 F |
| 2,748,303 | 5/1956 | Thorngton | 252/301.4 X |
| 2,851,425 | 9/1958 | Thorngton | 252/301.6 F |
| 3,014,875 | 12/1961 | DeGraab et al. | 252/301.4 F |
| 3,014,878 | 12/1961 | Koelmans | 252/301.6 F |
| 3,416,019 | 12/1968 | Kaduk | 252/301.6 X |
| 3,458,452 | 7/1969 | Hummel et al. | 252/301.6 F |

*Primary Examiner*—James E. Poer
*Assistant Examiner*—J. Cooper
*Attorney*—A. T. Stratton and W. D. Palmer

[57] ABSTRACT

Phosphor composition is manganese-activated zinc-magnesium silico-germanate which also includes a small addition of arsenic and lead. In the method of preparing the phosphor composition, the magnesium is added as the fluoride. The phosphor is excited by 254 nm. ultraviolet radiations to fluoresce with a narrow-band, very efficient emission which is concentrated in the green region of the visible spectrum.

6 Claims, 1 Drawing Figure

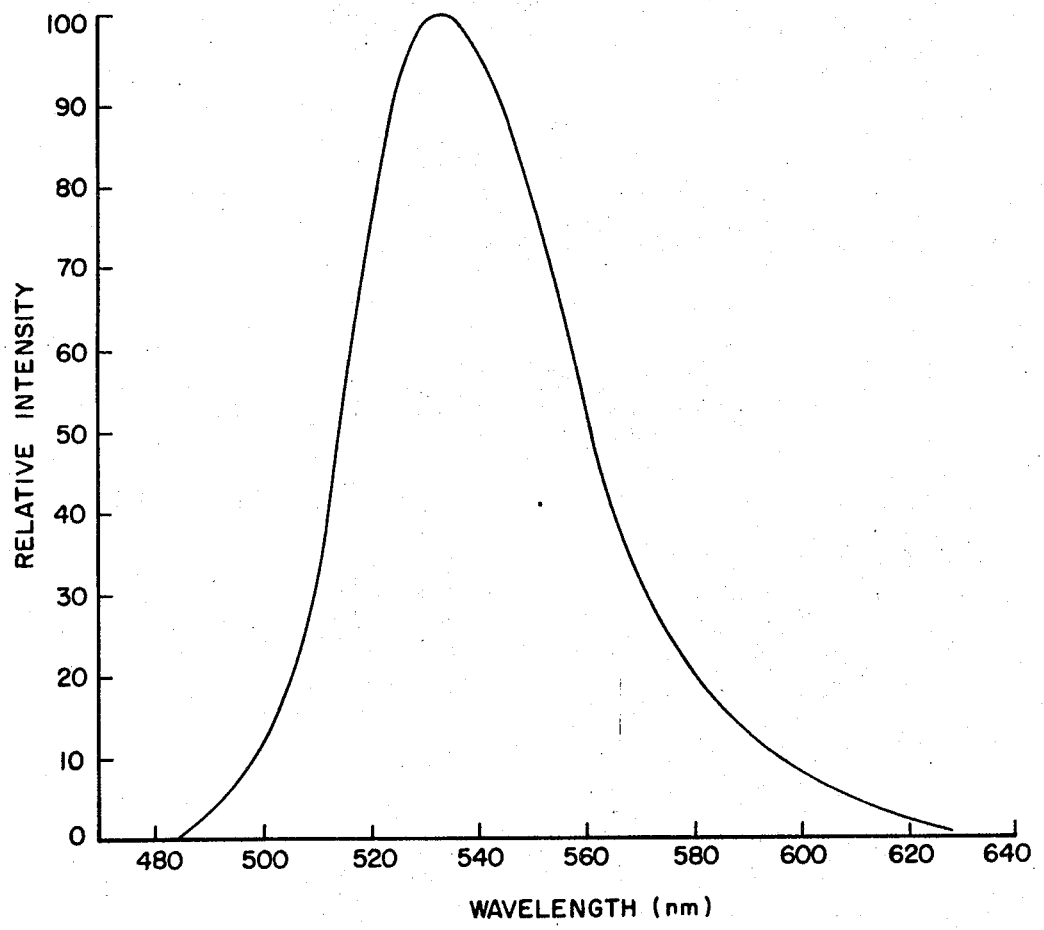

ZINC-MAGNESIUM SILICO-GERMANATE PHOSPHOR COMPOSITION AND METHOD OF PREPARING SAME

CROSS-REFERENCE TO RELATED APPLICATION

This application is a continuation-in-part of application, Ser. No. 834,971, filed June 20, 1969, now abandoned by the present inventors and assigned to the present assignee.

BACKGROUND OF THE INVENTION

This invention relates to an improved phosphor composition and method of preparing same and, more particularly, to a zinc-magnesium silico-germanate luminescent composition and a method for preparing same whereby the performance of the composition is improved.

Manganese-activated zinc silicate has been known for many years to be an efficient phosphor having its output concentrated in the green region of the visible spectrum. In accordance with U.S. Pat. No. 2,554,999 dated May 29, 1951, the so-called maintenance of initial light output is improved somewhat by the addition thereto of some lead and a very small amount of arsenic. It is also disclosed in U.S. Pat. No. 3,416,019 that such a zinc silicate phosphor can also be improved with respect to its so-called maintenance by the addition to phosphor raw mix of a very small amount of magnesium fluoride.

In U.S. Pat. No. 2,748,303, dated May 29, 1956, is disclosed a manganese-activated magnesium fluorogermanate phosphor which has its output concentrated in the red region of the visible spectrum. A somewhat similar phosphor is manganese-activated magnesium-zinc fluorogermanate which is disclosed in U.S. Pat. No. 2,851,425, dated Sept. 9, 1958. A further modification of a red-emitting phosphor is a magnesium fluorogermanate-type phosphor which incorporates additional silica, titania and tin oxide, as disclosed in U.S. Pat. No. 3,014,875, dated Dec. 26, 1961.

A manganese-activated zinc-magnesium germanate or silico-germanate is disclosed in U.S. Pat. No. 3,458,452, dated July 29, 1969. In the preparation of this phosphor, magnesium is added to the raw mix as basic magnesium carbonate, for example.

SUMMARY OF THE INVENTION

The luminescent composition is expressible by the formulation:

$(2-v)ZnO \cdot vMgO \cdot (1-w)SiO_2 \cdot wGeO_2 : xMn, yAs,$ and $zPb$, wherein $v$ is from 0.15 to 0.45, $w$ is from 0.35 to 0.7, $x$ is from 0.01 to 0.06, $y$ is from $4\times10^{-5}$ to $5\times10^{-3}$ and $z$ is from $4\times10^{-5}$ to $2\times10^{-3}$. In order to improve the performance of this phosphor, in the preparation of same the magnesium is added to the raw mix as the fluoride. When firing the raw mix, the fluoride converts to the oxide by a mechanism which is not completely understood, but this results in substantial improvement both in maintenance of initial light output as well as the initial light output of the resulting phosphor. The arsenic and lead additions greatly improve both the initial light output and the maintenance of the initial light output of the phosphor.

BRIEF DESCRIPTION OF THE DRAWING

For a better understanding of the invention, reference may be had to the sole FIGURE of the accompanying drawing which is a spectral energy distribution curve for the present phosphor wherein relative emission intensity is plotted versus wavelength in nanometers.

DESCRIPTION OF THE PREFERRED EMBODIMENTS

The phosphor raw mix is prepared by intimately mixing the following finely divided luminescent grade constituents: 1.7 mols zinc oxide, 0.3 mol magnesium fluoride, 0.6 germanium dioxide, 0.4 mol silicon dioxide, 0.03 mol manganous carbonate, 5 times $10^{-4}$ mol arsenic trioxide, and 4 times $10^{-4}$ mol lead oxide (PbO). Preferably the raw mix is fired for about two hours at 1,200° C. in air, the fired material ground, and the ground material then refired for 1 hour in a nitrogen atmosphere at 1,100° C. The spectral energy distribution of the resulting luminescent composition, under excitation by 254 nm. radiation, is shown in the sole FIGURE of the drawing and, as illustrated, the narrow-band emission peaks at a wavelength of about 535 nm.

Broadly summarizing the method of making the present phosphor, it is necessary to add the magnesium as the fluoride in order that the improved performance is obtained. The zinc, germanium, silicon, manganese and arsenic are added in the form of oxygen-containing compounds which can either be the oxide or, for example, another compound such as the carbonate. The lead can be added as compound other than an oxygen-containing compound, such as, for example, lead fluoride, without affecting the performance of the final phosphor. Summarizing, in formulating the raw mix, finely divided magnesium fluoride is mixed with oxygen-containing compounds of the metals zinc, germanium, silicon, manganese and arsenic together with lead compound. The magnesium fluoride, together with the oxygen-containing compounds and the lead compound, as expressed in equivalent gram-mol amounts of metallic oxides, are present in such relative amounts as to provide the following gram-mol proportions:

$(2-v)ZnO$, $vMgF_2$, $(1-w)SiO_2$, $wGeO_2$, $xMnO$, $yAs_2O_3$, $zPbO$, where $v$ is from 0.15 to 0.45, $w$ is from 0.35 to 0.7, $x$ is from 0.01 to 0.06, $y$ is from $2\times10^{-5}$ to $2.5\times10^{-3}$, and $z$ is from $4\times10^{-5}$ to $2\times10^{-3}$. After the raw mix has been prepared, it is fired in atmosphere comprising oxygen at a predetermined temperature and for a sufficient time to react with the raw mix constituents to form the phosphor. In the preferred formulation for preparing the phosphor, $v$ is about 0.3, $w$ is about 0.6, $x$ is about 0.03, $y$ is about $5\times10^{-4}$ and $z$ is about $4\times10^{-4}$. The firing temperatures and times are not particularly critical and the phosphor raw mix is fired at a temperature from about 1,000° to 1,350° C. for a period of from 1 to 8 hours, with the lower the firing temperature the longer the firing time. More specifically, a two-step firing process is used wherein the raw mix initially is fired at a temperature of from 1,150° to 1,250° C. in an air atmosphere for a period of from 1 to 4 hours, with the lower the firing temperature the longer the firing time. The preferred initial firing conditions are air firing at about 1,200° C. for about two hours. The first fired phosphor is then ground and the ground phosphor is then refired at about 1,050° to 1,150° for a period of ½ to 2 hours, with the lower the firing temperature the longer the firing time. The preferred second firing conditions are in a nitrogen atmosphere at about 1,100° C. for about 1 hour.

Broadly summarizing the fired luminescent composition, it is expressible by the following formulation:

$(2-v)ZnO \cdot vMgO \cdot (1-w)SiO_2 \cdot wGeO_2 : xMn$, $yAs$ and $zPb$, wherein $v$ is from 0.15 to 0.45, $w$ is from 0.35 to 0.7, $x$ is from 0.01 to 0.06, $y$ is from $4\times10^{-5}$ to $5\times10^{-3}$ and $z$ is from $4\times10^{-5}$ to $2\times10^{-3}$.

In the preferred phosphor embodiment, $v$ is about 0.3, $w$ is about 0.6, $x$ is about 0.03, $y$ is about $1\times10^{-3}$, and $z$ is about $4\times10^{-}$. It is noted that during the firing process the magnesium fluoride converts to the oxide. In control tests, the use of magnesium as the fluoride in the raw mix improves the initial light output of the phosphor by approximately 10 percent and the maintenance of initial light output, as the phosphor is operated, is also improved about 10 percent over the performance of a control phosphor which was prepared by using magnesium oxide in the raw mix.

The improved performance of the phosphor which results from incorporating the arsenic and lead is very significant. In control tests, 40-watt fluorescent lamps made with the foregoing zinc-magnesium silico-germanate phosphor without the arsenic and lead provided a "zero" hour lumen output of 2,650 lumens. The identical phosphor prepared with arsenic and lead, when incorporated into similar lamps, provided a "zero" hour lumen output of 4,530 lumens. This of course is over 110 lumens per watt. After 100 hours of burning, the control lamps which did not incorporate the arsenic and lead doped phosphor had an output of 1,000 lumens, in contrast to an output of 3,500 lumens for similar lamps which incorporate the lead and arsenic treated phosphor. This improvement is especially significant since arsenic and lead additions to a zinc silicate phosphor frequently have no affect or even a slight deleterious affect on initial brightness, with the main improvement of these additions residing in the improved so-called maintenance characteristics of the phosphor. Apparently the main effect on improvement is in the germanate portion of the present phosphor.

The effect of varying the amount of arsenic in the phosphor is quite pronounced. In control tests wherein the arsenic content was varied, it was observed that the maintenance of initial light output began dropping rapidly when the gram-atom content of arsenic per gram-mol of phosphor matrix was less than $4 \times 10^-$. When the amount of arsenic present was $2 \times 10^{-5}$ gram-atom per gram-mol of phosphor matrix, the maintenance of initial light output after 100 hours operation was only 63 percent of that of an otherwise identical phosphor which incorporated $1 \times 10^{-3}$ gram-atom of arsenic per gram-mol of phosphor matrix. In setting forth the general formulation of the fired material, the arsenic and lead have been expressed as activators since they are present in what constitutes activator proportions. The exact functioning of these materials, however, is not understood.

We claim:

1. The method of making manganese-activated zinc-magnesium silico-germanate phosphor to improve the performance thereof, which method comprises:

a. mixing together as a phosphor raw mix finely divided magnesium fluoride, oxygen-containing compounds of the metals zinc, germanium, silicon, manganese and arsenic and lead compound, wherein said magnesium fluoride, together with said oxygen-containing compounds and said lead compound, as expressed in terms of equivalent gram-mol amounts of metallic oxides, are present in such relative amounts as to provide the following gram-mol proportions:

$(2-v)ZnO$, $vMgF_2$, $(1-w)SiO_2$, $wGeO_2$, $xMnO$, $yAs_2O_3$, $zPbO$, wherein $v$ is from 0.15 to 0.45, $w$ is from 0.35 to 0.7, $x$ is from 0.01 to 0.06, $y$ is from $2 \times 10^{-5}$ to $2.5 \times 10^{-3}$, and $z$ is from $4 \times 10^{-5}$ to $2 \times 10^{-3}$; and b. firing the foregoing raw mix in an atmosphere comprising oxygen at a temperature of from about 1,000° to 1,350° C. for from 1 to 8 hours, with the lower the firing temperature the longer the firing time, to form said phosphor.

2. The method as specified in claim 1, wherein $v$ is about 0.3, $w$ is about 0.6, $x$ is about 0.03, $y$ is about $5 \times 10^{-4}$, and $z$ is about $4 \times 10^{-4}$.

3. The method as specified in claim 1, wherein said raw mix is fired at from 1,150° to 1,250° C. in an air atmosphere for 1 to 4 hours, with the lower the temperature the longer the firing time, the first fired material is ground, and the ground material then refired in a nitrogen atmosphere at from about 1,050° to about 1,150° C. for from ½ to 2 hours, with the lower the temperature the longer the firing time.

4. The method as specified in claim 3, wherein said raw mix is fired at about 1,200° C. in an air atmosphere for about 2 hours, then ground, and the ground material is then fired in a nitrogen atmosphere at about 1,100° C. for about 1 hour.

5. A luminescent composition:

$(2-v)ZnO \cdot vMgO \cdot (1-w)SiO_2 \cdot wGeO_2 : xMn$, $yAs$, and $zPb$, wherein: $v$ is from 0.15 to 0.45, $w$ is from 0.35 to 0.7, $x$ is from 0.01 to 0.06, $y$ is from $4 \times 10^{-5}$ to $5 \times 10^{-3}$, and $z$ is from $4 \times 10^{-5}$ to $2 \times 10^{-3}$.

6. The luminescent composition as specified in claim 5, wherein $v$ is about 0.3, $w$ is about 0.6, $x$ is about 0.03, $y$ is about $1 \times 10^{-3}$, and $z$ is about $4 \times 10^{-4}$.

* * * * *